US010984934B2

(12) United States Patent
Markiewicz et al.

(10) Patent No.: US 10,984,934 B2
(45) Date of Patent: Apr. 20, 2021

(54) FAST INDUCTIVE HEATERS FOR ACTIVE QUENCH PROTECTION OF SUPERCONDUCTING COIL

(71) Applicant: Florida State University Research Foundation, Inc., Tallahassee, FL (US)

(72) Inventors: William Denis Markiewicz, Ipswich, MA (US); Mark D. Bird, Monticello, FL (US)

(73) Assignee: FLORIDA STATE UNIVERSITY RESEARCH FOUNDATION, INC., Tallahassee, FL (US)

( * ) Notice: Subject to any disclaimer, the term of this patent is extended or adjusted under 35 U.S.C. 154(b) by 0 days.

(21) Appl. No.: 16/715,349

(22) Filed: Dec. 16, 2019

(65) Prior Publication Data

US 2020/0194154 A1 Jun. 18, 2020

Related U.S. Application Data

(60) Provisional application No. 62/779,832, filed on Dec. 14, 2018.

(51) Int. Cl.
*H02H 5/00* (2006.01)
*H01F 6/02* (2006.01)

(52) U.S. Cl.
CPC .................................... *H01F 6/02* (2013.01)

(58) Field of Classification Search
None
See application file for complete search history.

(56) References Cited

U.S. PATENT DOCUMENTS 5,278,380 A * 1/1994 Lowry .................. H02H 7/001 219/635
8,072,301 B2 * 12/2011 Timinger ........... G01R 33/3806 335/216

* cited by examiner

*Primary Examiner* — Stephen W Jackson
(74) *Attorney, Agent, or Firm* — Fox Rothschild LLP

(57) ABSTRACT

An active quench protection system for a superconducting coil in a magnet includes a quench detector. An inductive heating device is configured to generate an electric field to inductively heat a portion of the superconducting coil. A processor can generate a quench signal responsive to the detection of a quench by the quench detector to cause the inductive heating device to generate the electric field to inductively heat a portion of the superconducting coil. A quench power source can supply a time varying current to the inductive heating device to generate the electric field responsive to a quench signal from the processor. A magnet and a method for the active quench protection of a superconducting coil in a magnet are also disclosed.

42 Claims, 14 Drawing Sheets

FAST INDUCTIVE HEATERS FOR ACTIVE QUENCH PROTECTION OF SUPERCONDUCTING COIL

CROSS-REFERENCE TO RELATED APPLICATIONS

This application claims priority to U.S. Provisional Patent Application No. 62/779,832 filed on Dec. 14, 2018, entitled "FAST INDUCTIVE HEATERS FOR ACTIVE QUENCH PROTECTION OF SUPERCONDUCTING COIL", the entire disclosure of which is incorporated herein by reference.

STATEMENT REGARDING FEDERALLY SPONSORED RESEARCH AND DEVELOPMENT

This invention was made with government support under Contract No. DMR1644779 awarded by the National Science Foundation. The government has certain rights in this invention.

FIELD OF THE INVENTION

The present invention is directed to superconducting coils and magnets containing superconducting coils and to active quench protection for superconducting coils and for magnets containing superconducting coils.

BACKGROUND OF THE INVENTION

In a superconducting magnet, due to essentially zero resistance of the superconducting coil, there is no power loss as is typically seen for example in a normal resistive copper coil. Superconducting magnets operate at high current density such that a copper coil, operated at that current density, would quickly overheat. Superconducting and normal resistive are two states, just as ice and water are two states. Adding heat to a superconducting coil will result in a change to the resistive state. In a superconducting coil winding, there can be local faults, or fractures of the conductor, or mechanical events that produce heat and result in a local normal resistive region. This generates more heat and thus a local fault condition can spread throughout the coil. This condition is known as a quench.

A quench is a failure mode of a superconducting coil. Unless the coil is protected, a quench can result in damage to the coil. Typically, to prevent damage, once a quench begins in a superconducting coil, the quench must spread through a sufficiently large portion of the coil to prevent local energy deposition and local overheating. A quench can proceed in a number of ways. If the local fault results in heating which remains local, all the energy of the magnet is deposited in a small region and the coil likely overheats. For a magnet to be safe and survive a local fault, the initial local heating must spread quickly. If the heating spreads, the stored energy is deposited over the entire coil, and the resulting maximum temperature is typically low. The spread of heating is called quench propagation. Effective quench propagation is an essential component of quench protection.

In small single coils, in some circumstances, quench can spread naturally in the coil and the coil is then naturally protected. When natural quench propagation in a coil is sufficient to spread the quench adequately, the coil is called self-protecting. If the natural quench propagation is too slow to protect the coil, active intervention is used to spread the quench. This is called active protection. As coils increase in size, and especially if a magnet consists of multiple coils, the spread of quench must be facilitated by active protection. An active protection begins with quench detection in order to know that a failure mode has occurred. A typical active protection system involves first detecting the start of a quench by voltage measurements. Detection is followed by active initiation of additional quench zones in a coil to spread the quench. Active initiation involves a means to locally heat a coil to exceed the critical temperature at field of the superconductor and thereby drive the coil locally to quench. Often heaters in contact with the coil are then fired. The heaters cause other portions of the coil to go normal, thereby propagating the quench as required for protection.

In magnets consisting of multiple coils, quench can lead to damage via a second mechanism. If different coils are allowed to carry different currents, then if the current in one coil starts to change quickly, it can induce currents in neighboring coils. Many commercial magnets are built of multiple nested coils running electrically in series. If one coil quenches, diodes or resistors can allow alternate current paths to carry current around the normal zone. This helps avoid the local heating of the normal zone described above. However, dropping current in the coil experiencing quench can result in high induced currents in neighboring coils. These induced currents can lead to excessive mechanical stresses and damage. A successful quench protection system needs to avoid both local overheating and large-scale high stresses.

There are known low temperature superconducting (LTS) coils and high temperature superconducting (HTS) coils. Among HTS coils, it is further useful to distinguish insulated coils from no insulation (NI) coils. A coil can be made more compact and mechanically stronger by removal of the insulation. Certain coils such as those made of modern High Temperature Superconductors, especially rare earth barium copper oxide (REBCO) tape, can function effectively without insulation. An extra benefit is that the result provides for fast natural quench propagation. This means that NI coils avoid local overheating and can be self-protecting, which is very important especially in NI coils because a quench, when it happens, is very fast.

It has been shown that quench in NI coils provides fast quench propagation, but that quench is accompanied with induced current spikes that propagate through the coil. These current spikes indicate large transient currents. There is increasing evidence from a number of failures in NI coils that the failures are related to the current spikes. It is important to identify methods to control the magnitude of quench transient currents in NI coils.

NI coils have been relatively small and typically single coils, and these are the conditions most suitable for passive self-protection. As NI coils get larger, and especially in the case of multiple coil magnets, there is a general appreciation that passive self-protection will not be adequate, and some form of active protection will be necessary to adequately protect the magnet. But quench propagation in NI coils is very fast compared to insulated coils. If active protection is to influence the outcome of a quench situation in NI coils, then the active protection must operate fast as well. Such a method to rapidly quench NI HTS coils uniformly has not been available.

Active protection is widely used for LTS coils. Typically, the amount of time available for active protection to work with LTS coils is relatively long. Heater elements are typically resistive and heat when a current is applied. The heater element is typically in close mechanical and thermal contact with the coil to be quenched, and the heat is transferred by thermal diffusion from the heater to the coil. The process may be characterized as relatively slow and operates on the principle of thermal diffusion.

Active protection has been used for insulated HTS coils, the inner coils of the NHMFL 32 T superconducting magnet being an example. In this case, the time allowed for the operation of the heaters is again relatively long by virtue of the amount of copper stabilizer in the conductor. The heater elements are again in close mechanical and thermal contact with the windings. These heaters work by the principle of thermal diffusion from the heater element into the conductor in the coil. The main distinguishing characteristic from the LTS case is that with an HTS conductor, the critical temperature is higher and the amount of heat required is greater.

Thermal diffusion heaters are resistive elements which, when energized, become hot from ohmic loss. The elevated temperature is transferred to an adjacent superconducting coil by means of thermal diffusion. Thermal diffusion heaters are considered too slow for application to NI coils. Placing the resistive heater element within the windings helps to reduce the thermal diffusion time, but creates a disruption in the structure of the windings, and a problem with insulating the heater against the conductor. Current injection heaters can be imagined in which additional leads are attached to a section of a superconducting coil and additional current is rapidly forced into the windings. While this may lead to a quench, there are problems with two power supply circuits connected to the same coil that would have to be overcome.

Another type of controlled quench for superconducting coils is Coupled Loss Induced Quench (CLIQ). CLIQ uses rapidly changing current introduced directly into the windings of a superconducting coil by an auxiliary power supply and leads attached to the coil. The rapidly changing current and associated rapidly changing fields in the windings result in heating and quench. In the CLIQ system, an additional center tap of the coil circuit is used on the superconducting coil for connection of an AC power source. Turns in the coil windings that are in close proximity to one another experience an AC current with power loss and induced heating. The CLIQ circuit is connected directly to the magnet circuit. The CLIQ system is not compatible with NI superconducting coils, as the activating current would simply be shorted within the windings.

The natural fast quench propagation characteristic of NI coils is an important and fundamental aspect of the technology. The quench propagation that occurs results in single coils being thermally self-protecting, meaning that no further intervention is required to protect the coils from local hot spots in the event of a quench. But there are limitations to the self-protection of NI coils. As the size and field of magnets that use NI technology increases, the need to accommodate high values of mechanical stress in the windings motivates the use of multiple coil designs. But the division of a large single coil into multiple coils interferes with the natural propagation of quench throughout the coils of a magnet. While fast propagation is maintained in a single coil, propagation between coils is inhibited and slowed by the separation of the coils. The uniform spread of quench over the coils in the multiple coil magnet is thus disrupted. In addition to potential problems with voltage and temperature, the quench of a single coil in a multiple coil magnet also results in a large axial force between the coils of the magnet.

In an NI coil, during the quench propagation along a coil, the portion of the coil behind the quench front has quenched and is normal, while the portion of the coil ahead of the quench front is still superconducting. In that portion of the coil that has quenched, the circumferential current that is responsible for the field produced by the coil becomes a radial current. As a result, the magnetic center of the coil shifts in the axial direction with the portion of the coil that is still superconducting. A large axial force develops between the coil that is in the process of quenching and the remaining coils of the magnet. This is a serious problem that needs to be addressed in multiple coil NI magnets, and therefore in future high field NI magnets.

SUMMARY OF THE INVENTION

An active quench protection system for a superconducting coil in a magnet can include a quench detector. An inductive heating device can be configured to generate an electric field to inductively heat a portion of the superconducting coil. A processor is provided for generating a quench signal responsive to the detection of a quench by the quench detector to cause the inductive heating device to generate the electric field to inductively heat a portion of the superconducting coil. A quench power source can supply a time varying current to the inductive heating device to generate the electric field responsive to a quench signal from the processor.

The inductive heating device can include circular coiled conductor portions. The inductive heating device can include radial conductor portions. The inductive heating device can include circular dipole conductor portions. The inductive heating device can include a planar conductor portion.

The inductive heating device can generate an oscillating electric field having a frequency of 50 Hz to 100 kHz. The inductive heating device can have a current of from 300 A to 3000 A.

The quench detector can include at least one selected from the group consisting of a voltage sensors, optical sensors, and electromagnetic field sensors. The quench detector can include voltage taps for detecting the voltage drop between at least two positions of the superconducting coil.

The quench power source can include an AC power source. The quench power source can include a capacitor and a switch. Upon the detection of a quench by the quench detector the processor generates a quench signal to close the switch. The capacitor discharges to the inductive heating device, causing the generation of the electric field by the inductive heating device.

The quench power source can include a shunt circuit from the superconducting coil to an DC-AC converter. The DC-AC converter can be electrically connected to the inductive heating device. A quench switch can be provided between the superconducting coil and a superconducting coil power source. Upon the detection of a quench by the quench detector, the processor generates a quench signal to open the quench switch to shut off supply current to the superconducting coil, and a residual DC current from the superconducting coil is directed through the shunt circuit to the DC-AC converter. The converter changes direct current from the superconducting coil to alternating current, the alternating current generating the electric field in the inductive heating device.

The superconducting coil can be pancake wound. The superconducting coil can be layer wound. The inductive heating device for a layer wound superconducting coil can include at least one selected from the group consisting of axially directed portions, spiral portions, cylindrical portions and saddle-shaped portion. The superconducting coil can be a no insulation coil. The superconducting coil can be a rare earth barium copper oxide (ReBCO). The superconducting coil can be an insulated rare earth barium copper oxide (ReBCO).

A portion of the inductive heating device conforms to at least one selected from the group consisting of the dimensions and the shape of the superconducting coil. The inductive heating device can be provided at both ends of the superconducting coil or superconducting coil stack.

A magnet can include a superconducting coil, a quench detector for detecting a quench in the superconducting coil, and an inductive heating device configured to generate an electric field to inductively heat a portion of the superconducting coil. The magnet can further include a processor for generating a quench signal responsive to the detection of a quench by the quench detector to cause the inductive heating device to generate the electric field to inductively heat a portion of the superconducting coil, and a quench power source for supplying a time varying current to the inductive heating device to generate the electric field responsive to a quench signal received from the processor.

Therein the quench power source comprises a capacitor and a switch, wherein upon the detection of a quench by the quench detector the processor generates a quench signal to close the switch, wherein the capacitor discharges to the inductive heating device, causing the generation of the electric field by the inductive heating device. A portion of the inductive heating device conforms to at least one selected from the group consisting of the dimensions and the shape of the superconducting coil. The magnet can include a plurality of superconducting coils, and an inductive heating device adjacent each coil. The superconducting coils can be stacked, and inductive heating devices can be interposed between superconducting coils in the stack.

A method for the active quench protection of a superconducting coil in a magnet, can include the step of providing a quench detector, an inductive heating device for generating an electric field to inductively heat a portion of the superconducting coil, a quench power supply, and a processor for generating a quench signal responsive to the detection of a quench by the quench detector to cause the inductive heating device to inductively heat a portion of the superconducting coil. A quench is detected with the quench detector. A quench signal is generated from the processor responsive to the detection of the quench by the quench detector and causing the quench power supply to power the inductive heating device to inductively heat a portion of the superconducting coil.

BRIEF DESCRIPTION OF THE DRAWINGS

There are shown in the drawings embodiments that are presently preferred it being understood that the invention is not limited to the arrangements and instrumentalities shown, wherein.

DETAILED DESCRIPTION OF THE INVENTION

Figure 1:
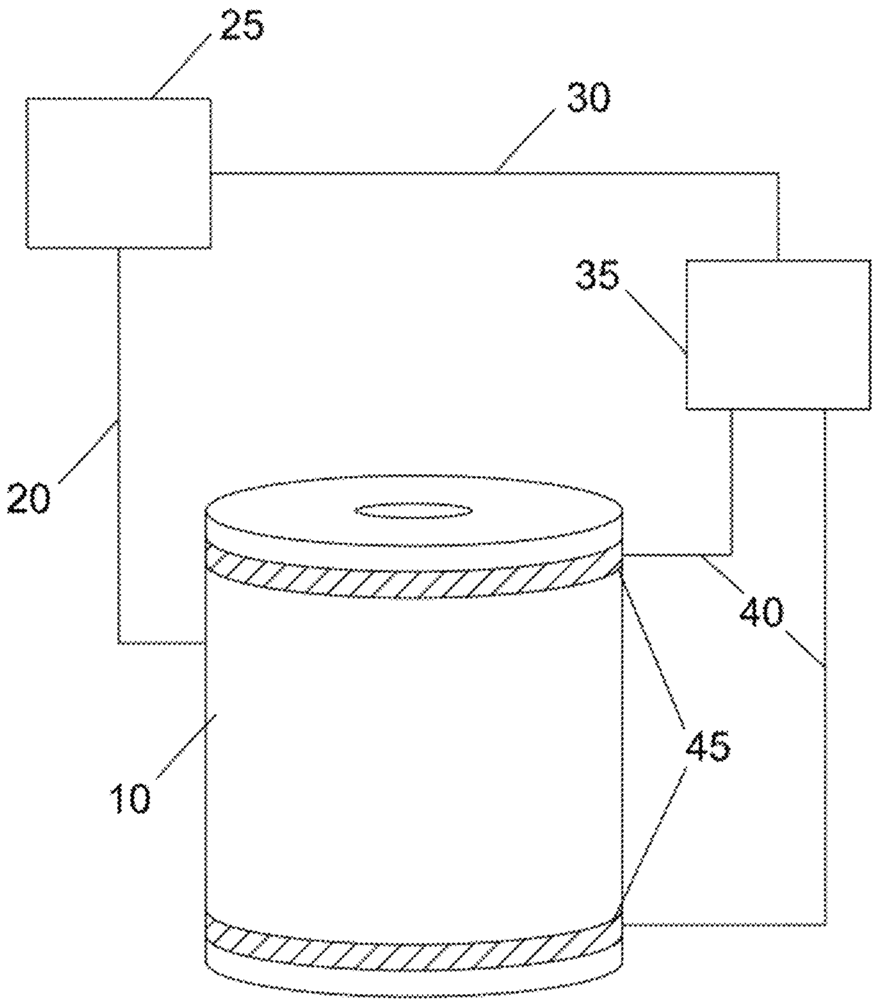
FIG. 1 is a schematic diagram of an single coil superconducting magnet with an active quench protection system.

An active quench protection system for a superconducting coil in a magnet includes a quench detector. An inductive heating device is configured to generate an electromagnetic field to inductively heat a portion of the superconducting coil. A processor can generate a quench signal responsive to the detection of a quench by the quench detector to cause the inductive heating device to generate the electromagnetic field to inductively heat a portion of the superconducting coil. A quench power source can supply a time varying current to the inductive heating device to generate the electromagnetic field responsive to a quench signal from the processor.

The function of the inductive heating device is to rapidly quench a superconducting coil by heating the superconductor and causing a transition to the normal state. The design of the inductive heating device can depend on the type of superconducting coil windings being protected. The inductive heating device can include circular coiled conductor portions. The inductive heating device can include radial conductor portions. The inductive heating device can include circular dipole conductor portions. The inductive heating device can be adapted for layer wound superconducting magnets and can be axially wound, spirally and cylindrically wound, or saddle shaped. The inductive heating device can include a planar conductor portion. The inductive heating device may be placed on the surface of a superconducting coil, at the ends or the outside diameter for example. The inductive heating device may also be placed within the windings, such as between pancakes in a pancake wound tape superconducting coil stack.

The inductive heating device can generate an oscillating electric field having a frequency of 50 Hz to 100 kHz. The inductive heating device can receive a current of from 300 A to 3000 A from a quench power source.

The quench detector can be any suitable quench detector. The quench detector can be at least one selected from the group that utilizes voltage sensors, optical sensors, and/or electromagnetic field sensors. The quench detector can include voltage taps for detecting the voltage drop between at least two positions of the superconducting coil.

The quench power source can be any suitable power source for causing the inductive heating device to generate an electric field and heat a portion of the superconducting coil. The quench power source can include an AC power source. The quench power source can include a capacitor and a switch, wherein upon the detection of a quench by the quench detector the processor generates a quench signal to close the switch, wherein the capacitor discharges to the inductive heating device, causing the generation of the electromagnetic field by the inductive heating device.

The quench power source can also include a shunt circuit from the superconducting coil to a DC-AC converter. The DC-AC converter can be electrically connected to the inductive heating device. A quench switch can be provided between the superconducting coil and a superconducting coil power source. Upon the detection of a quench by the quench detector, the processor generates a quench signal to open the quench switch to disconnect the supply current to the superconducting coil, and redirect the current from the superconducting coil through the shunt circuit to the DC-AC converter. The converter changes direct current from the superconducting coil to alternating current, which generates the electromagnetic field in the inductive heating device.

The invention is useful with different kinds of superconducting coils. The superconducting coil can be pancake wound. The superconducting coil can be layer wound. The superconducting coil can be a no insulation (NI) coil. The superconducting coil can include a rare earth barium copper oxide (ReBCO) superconducting material. The superconducting coil can be an insulated rare earth barium copper oxide (ReBCO). Other superconducting materials are possible. These superconducting materials can include Bi2223, Bi2212, and the LTS superconductors $Nb_3Sn$ and NbTi. The superconductor may range from wire to flat tape. The insulation system in the windings may range from insulated to no insulation (NI), and include all values from low to high of the contact resistance in a no insulation winding.

The inductive heating device can have a number of different shapes and sizes. A portion of the inductive heating device can conform to at least one selected from the group consisting of the dimensions and the shape of the superconducting coil. The inductive heating device can be adapted to insulated and no insulation superconducting coils, as well as pancake wound and layer wound superconducting coils. Other configurations are possible.

The invention has particular utility for superconducting magnets, but can have applications in other devices incorporating superconducting coils. The quench protection system can be utilized in a wide range of laboratories and companies that are involved in the design and production of superconducting magnets, including the large commercial production of future accelerator magnets.

A magnet according to the invention includes a superconducting coil and a quench detector for detecting a quench in the superconducting coil. An inductive heating device can be configured to generate an electromagnetic field to inductively heat a portion of the superconducting coil. The magnet can further include a processor for generating a quench signal responsive to the detection of a quench by the quench detector to cause the inductive heating device to generate the electric field to inductively heat a portion of the superconducting coil. A quench power source can be provided for supplying a time varying current to the inductive heating device to generate the electromagnetic field responsive to a quench signal received from the processor. The magnet can include a plurality of superconducting coils, and an inductive heating device adjacent each coil or in close enough proximity to generate an electromagnetic field which will initiate a quench in the coil. The superconducting coils can be stacked, and inductive heating devices can be interposed between superconducting coils in the stack.

A method of active quench protection of a superconducting coil in a magnet can include the step of providing a quench detector, an inductive heating device for generating an electric field to inductively heat a portion of the superconducting coil, a quench power supply, and a processor for generating a quench signal responsive to the detection of a quench by the quench detector to cause the inductive heating device to inductively heat a portion of the superconducting coil. A quench is detected with the quench detector. A quench signal is generated from the processor responsive to the detection of the quench by the quench detector and causes the quench power supply to power the inductive heating device to inductively heat a portion of the superconducting coil.

The present invention is an active protection system for HTS coils in general and applicable to HTS NI coils in particular, such as NI superconducting coils wound with REBCO superconductor. No-insulation (NI) superconducting coil technology is a relatively new development. Usually a coil needs to be insulated in order to charge the coil be increasing the current, otherwise the coil is shorted against the charging voltage. It was found, however, that in a superconducting REBCO winding, the residual contact resistance between conductor turns was adequate to allow coils to be charged to field. The motivation for removing the insulation was to remove the associated space in the windings and result in a more compact coil. In addition, unexpectedly, NI coils were found to display rapid natural quench propagation. Once the quench is started, the quench spreads quickly over the extent of the coil and thereby provides protection from local damage. This natural quench propagation is now understood to be a characteristic feature of NI coils, extending over greatly increased values of contact resistance than seen initially between bare REBCO conductors, and allowing the use of steel co-wind between conductors as required for high field magnets.

An active quench protection system according to the invention includes a quench detector and can include logic operable with the processor to distinguish an actual quench. The active quench protection system includes an inductive heating device, or set of inductive heating devices, and a quench power source. The load, or target, for the energy transfer from the inductive heating device is the windings of a superconducting coil. The transfer of energy from the inductive heating device to the windings is by electromagnetic induction through the AC fields generated by the inductive heating device. The inductive heating devices are electrically isolated from the coil windings, and while not limited to, are particularly useful with No Insulation (NI) superconductor coils.

Large and multiple coil magnets require the rapid spread of quench throughout the multiple coils. Thermal diffusion heaters are too slow to affect the outcome of quench in NI coils. The present invention of fast inductive heating devices allows active protection methods to be effectively employed in NI coil systems. The inductive heating devices may be used more generally as well, such as for insulated HTS coils, where the use of fast inductive heating devices can reduce the amount of stabilizer copper that is used in the conductor. The fast inductive heating devices of the invention could also be used on LTS magnets. In multiple coil magnets, natural quench propagation between coils is inhibited by the physical separation between coils. Active quench protection is traditionally used to address this problem. The invention can rapidly create multiple quench zones by the action of one or more of the inductive heating devices. Further, it is known by analysis that in multiple NI coils, natural quench propagation leads to high unacceptable inter-coil forces. Such forces may be implicated in magnet failures that have been observed. Active protection provides the means to control the quench process and to eliminate the destructive effects of inter-coil forces. The fast inductive heating devices of the invention make active protection of NI coils practical.

Two potentially detrimental effects have been identified in no insulation (NI) coils including quench transient current spikes generally and quench axial offset forces in multicoil magnets. Both of these effects can be addressed with a fast active quench protection system made possible with a fast inductive quench heating device. In order to address current spikes and axial forces, in addition to having fast action, it is important that the inductive quench heating device be placed at the ends of all coils in a multiple coil set. In the case of axial force reduction, the symmetric quench pattern created by the induced quench from the heating devices at all coil ends tends to reduce the initial asymmetry of a spontaneous quench starting at one location or one end of a coil. A symmetric quench pattern eliminates the axial offset force in an NI coil. In the case of quench transient current spikes, the magnitude of the current spikes increases with the length of coil over which the quench propagates. By actively initiating quench at both ends of a coil, the effective length of a coil for quench propagation is reduced by half, and the maximum magnitude of the current spikes is reduced accordingly. The placement of active quench heating devices at both ends of a coil, or at all ends of all coils in a multiple coil magnet, is therefore an aspect of the invention.

The inductive heating device is activated when a quench condition is detected by the quench detector in the superconducting coil or set of connected superconducting coils that constitute a superconducting magnet. The inductive heating device creates a quench region at or near the location of the inductive heating device. With multiple distributed inductive heating devices, the superconducting coil is caused to quench in multiple distributed locations, including multiple superconducting coils. A feature of the inductive heating device is that it is electromagnetically inductively coupled to the superconducting coil windings, as opposed to relying on thermal diffusion as in existing conventional heaters. As a result, the action of the inductive heating device is much faster than the thermal diffusion heater. The speed of the inductive heating device makes it practical to be used with superconducting coils and groups of superconducting coils that require fast heaters for protection.

The general configuration involves the inductive heating device being positioned in close proximity to the superconducting coil windings. The inductive heating device is activated by a time dependent current. By means of electromagnetic induction, the inductive heating device is coupled to the windings of the coil. In concept, activation of the inductive heating device will cause energy dissipation in the windings, resulting in heating and temperature rise, and as the result of the temperature dependence of the critical current, will result in a quench initiation in the conductor in the coil.

The inductive heating device of the invention is non-invasive. It is not connected electrically to the subject coil and therefore does not interact with the main power supply. It is not in immediate close physical contact with the coil windings and therefore does not represent an insulation problem. And the inductive heating device is potentially much faster than present thermal diffusion heaters, relying on inductive coupling rather than being limited by thermal conductivity.

Quench propagation typically occurs rapidly in NI coils. The quench process has been studied and the mechanism for rapid quench is understood. This understanding has been incorporated into the design of the inductive heating device. The essential distinguishing characteristic of an NI coil is the lack of insulation between turns and the low value of resistance between turns, called the contact resistance. This low resistance allows an additional degree of freedom to the current in the coil. In the usual insulated coil case there is only a circumferential current, but in NI coils there can be a radial current as well. In an insulated coil there is only one current, the global circumferential current. In NI coils, in every local region of the coil, there can be a mix of circumferential and radial currents. In an NI coil, in any small region that is undergoing quench and changing from superconducting to normal, the current in the region can change from circumferential to radial. This cannot happen in an insulated coil. Because the current in a local region can change, the circumferential current in that region can decrease rapidly. Then, by inductive coupling within the windings to nearby turns, those nearby turns respond by increasing in current rapidly. Again, this cannot happen in an insulated coil where there is only the one global current. The reason why a large local increase in current can occur in an NI coil is because that increase is not forced to be an increase in the current of the entire rest of the coil, but rather can turn back on itself through a radial current to form a closed current loop. This behavior is fundamental to quench in an NI coil. The local increase in current brings the conductor closer to the critical current, at which quench would occur. If the increased current exceeds the critical current, then automatically that conductor is quenched and the propagation proceeds. But it is not necessary that the increased current exceeds the critical current directly for quench to proceed. Rather, the radial current causes heating which decreases the critical current below the operating current and which results in quench.

There is shown in FIG. 1 a superconducting coil 10. A quench detector and information processor 25 is provided to receive voltage information from the superconducting coil and determine is a quench condition exists. A signal line 20 connects voltage taps on the superconducting coil to the quench detector. The processor, responsive to the detection of a quench, sends an activation signal through signal line 30 to the inductive heater power supply 35. AC power from the heater power supply is provided through power leads 40 to the inductive heating device 45, shown in this embodiment positioned at and covering the ends of the superconducting coil.

Figure 2:
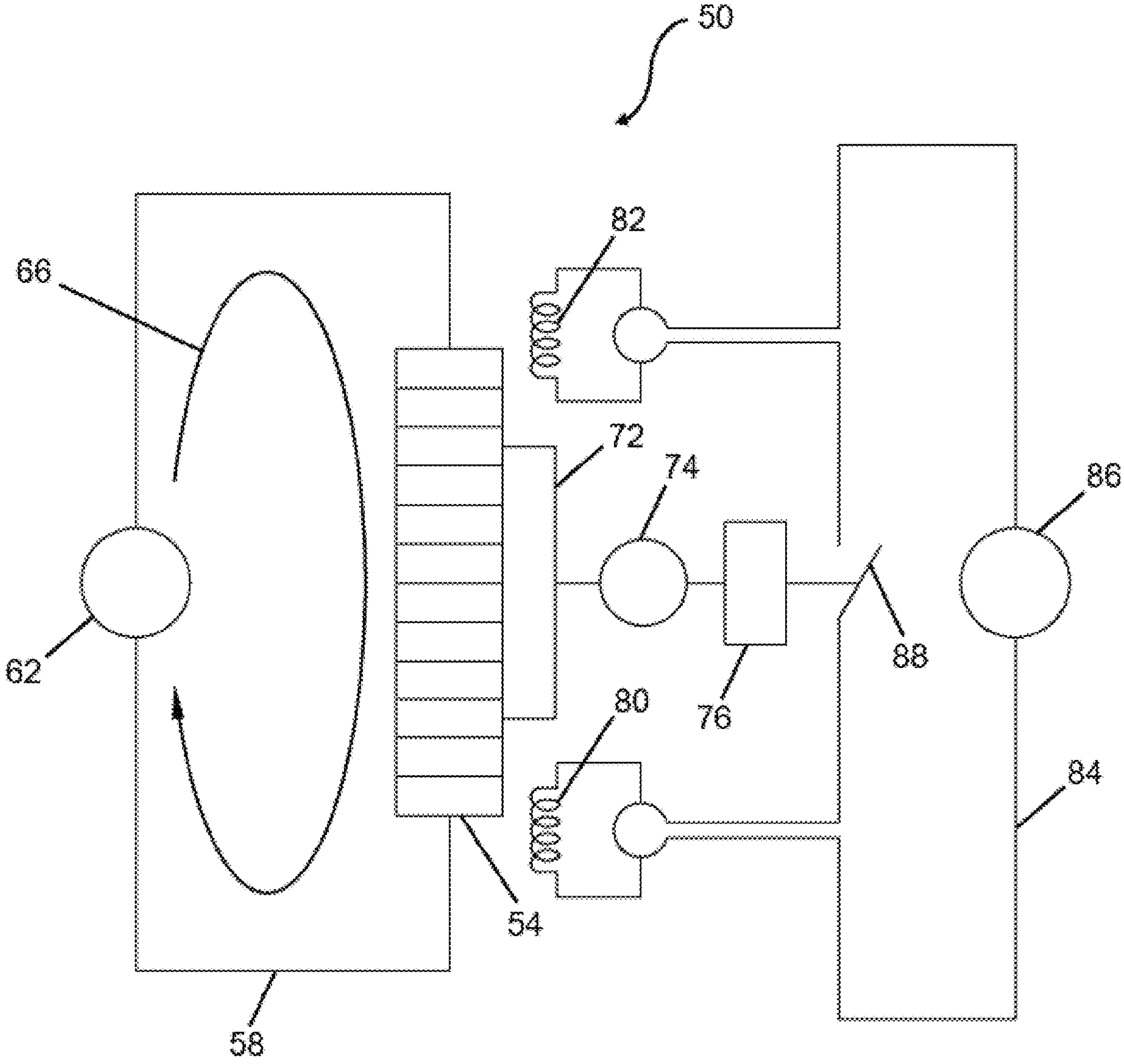
FIG. 2 is a schematic circuit diagram of an alternative embodiment.

There is shown in FIG. 2 a schematic diagram of an alternative embodiment of a quench protection system 50. The system 50 can include a multiple pancake wound coil magnet 54 connected by circuit 58 to an DC source 62 generating current flow 66. Sensor leads 72 communicate with suitable sensor components such as voltage taps and also communicate with quench detector 74 such as, but not limited to, a voltage sensor. A change in voltage associated with the detection of a quench causes the quench detector 74 to send an appropriate signal to processor 76. The quench protection system 50 further includes inductive heating devices 80 and 82. The inductive heating devices 80 and 82 are positioned appropriately relative to the superconducting magnet 54 such that an electromagnetic field generated by the inductive heating devices 80 and 82 will heat portions of the coils of the superconducting magnet 54.

A quench protection system powering circuit 84 communicates with a quench power source 86 and a quench switch 88. The quench switch 88 is controlled by a suitable signal from the processor 76. Upon receipt of a quench signal from the quench detector 74, the processor 76 causes the quench switch 88 to close, wherein the inductive heating devices 80 and 82 will be powered with a time varying current from the quench power source 86 such as will induce an electromagnetic field. The electromagnetic field will contact the superconducting coils of the magnet 54 to generate a protective quench in multiple locations in the magnet 54.

Figure 3:
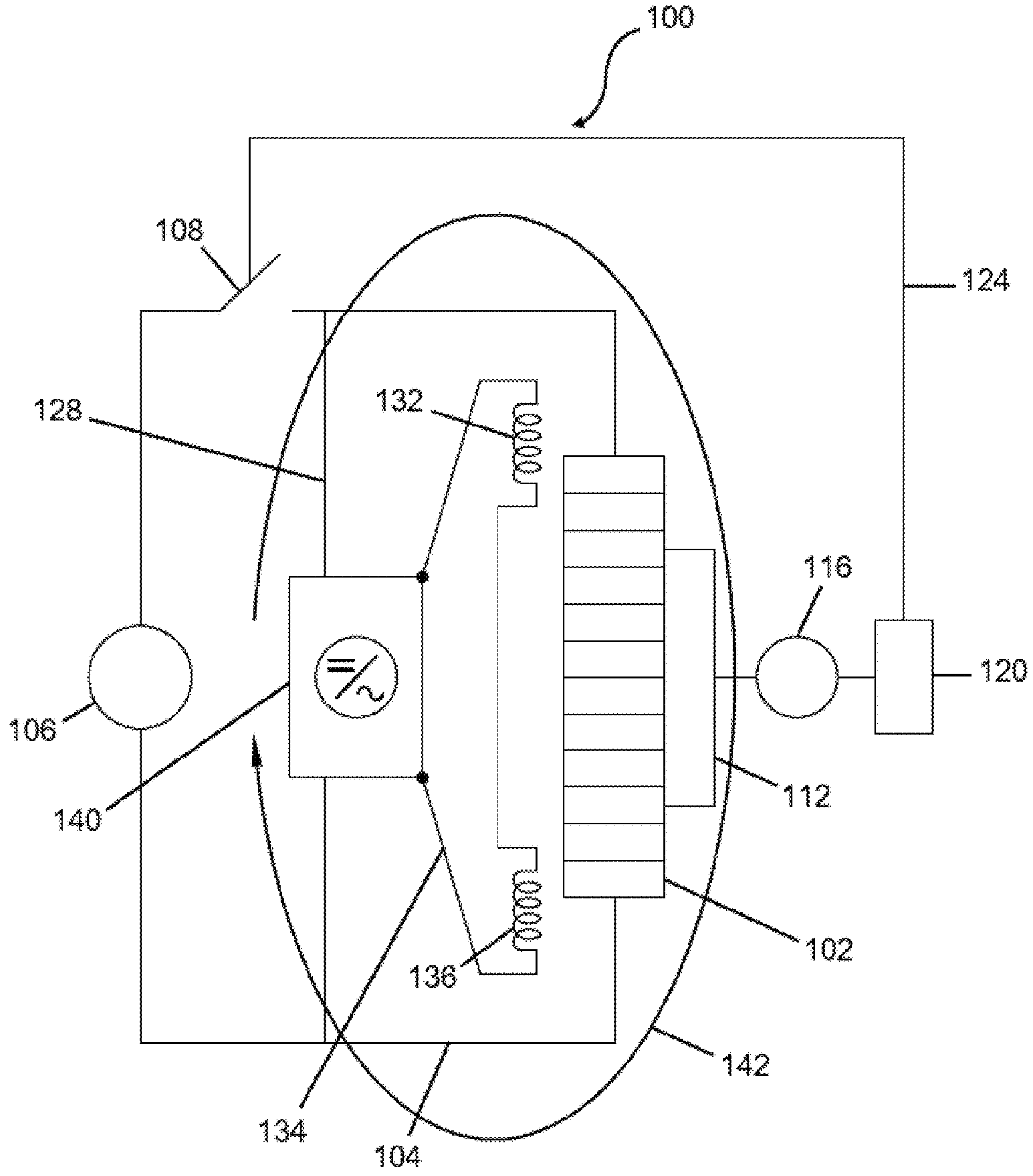
FIG. 3 is a schematic circuit diagram of another alternative embodiment.

FIG. 3 is a schematic diagram of another alternative embodiment of a quench protection system 100. A superconducting magnet 102 is connected by circuit 104 to a magnet power source 106. A quench switch 108 is provided in the circuit 104 between the magnet power source 106 and the superconducting magnet 102. Quench detector leads 112 communicate with a quench detector 116 such as the voltage meter shown. The quench detector 116 communicates with a processor 120. The processor 120 has a control signal line 124 to the quench switch 108.

A quench shunt circuit 128 is in parallel with the magnet power source 106. The quench switch 108 is between the magnet power source 106 and the superconducting magnet 102, but is not within the quench shunt circuit 128. Upon receipt of a quench signal from the processor 120 the quench switch 108 will be caused to open which will open the circuit between the magnet power source 106 and the superconducting magnet 102. Inductive heating devices 132 and 136 are provided in an inductive heating circuit 134 and positioned to generate an electromagnetic field which will cause heating and quench of the superconducting magnet 102. A DC-AC converter 140 is also provided in the quench circuit 128. Following the opening of the quench switch 108, the current of the superconducting magnet 102 will flow as current 142 through the DC-AC converter. The DC-AC converter 140 will take this direct current and create a time varying current which will be passed to the inductive heating devices 132 and 136 through the inductive heating circuit 134. This will cause the inductive heating devices 132 and 136 to generate an electromagnetic field to heat portions of the superconducting magnet 102.

Figure 4:
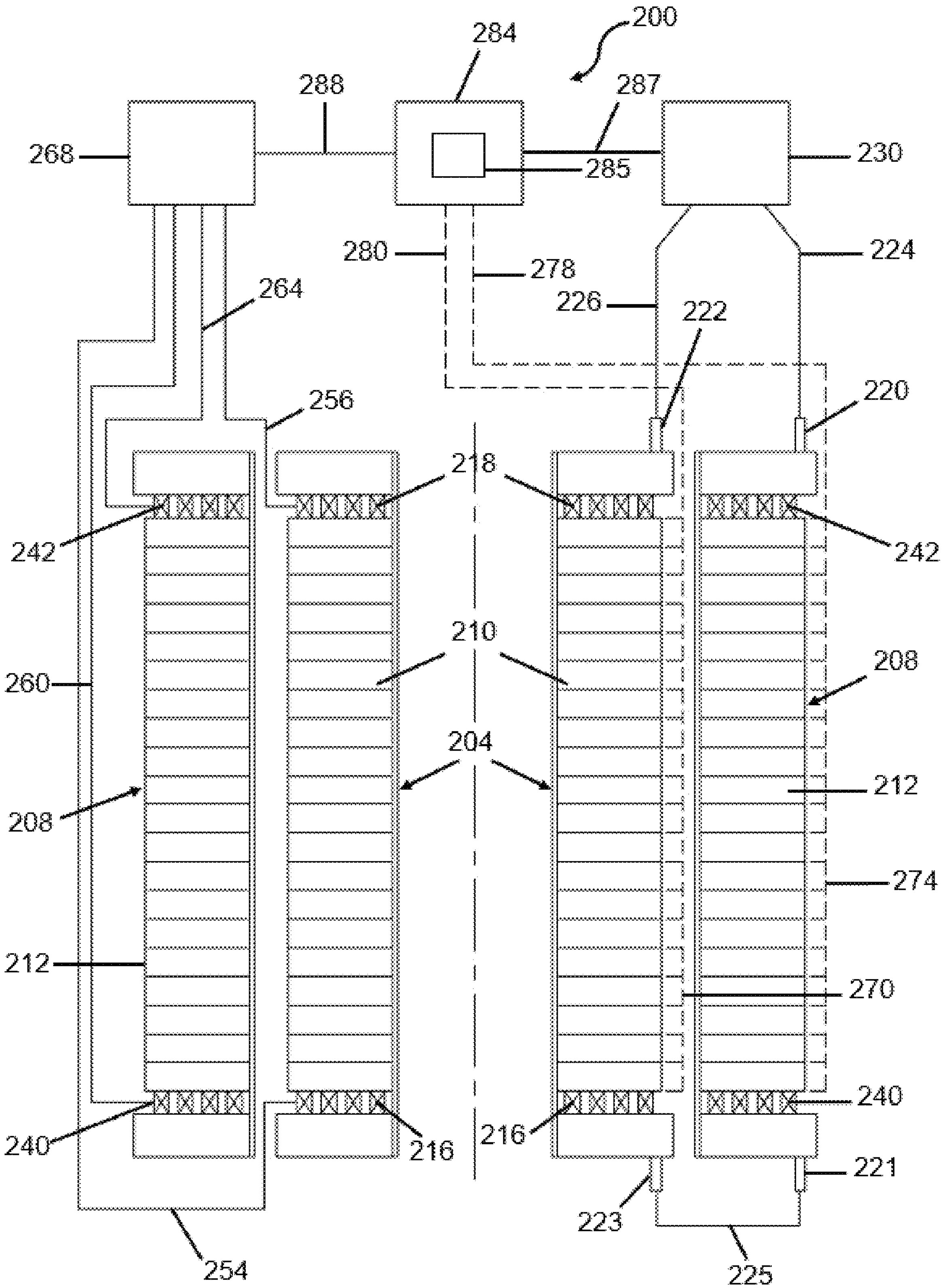
FIG. 4 is a schematic cross sectional diagram of a multiple coil pancake wound superconducting magnet with an active quench protection system.

FIG. 4 is a schematic diagram of a pancake wound superconducting magnet with an active quench protection system 200. The system 200 is shown with a multiple coil superconducting magnet that is formed from an inner multiple pancake wound coil stack 204 and an outer pancake wound coil stack 208. The inner pancake wound coil stack 204 is comprised of a plurality of stacked superconducting pancake coils 210. The outer pancake wound coil stack 208 is comprised of stacked superconducting pancake coils 212. A contact 220 communicates the outer coil stack 208 with magnet power source 230 by electrical connection 224. A contact 222 communicates the inner coil stack 204 with the magnet power source 230 by electrical connection 226. A power bridge can be provided by electrical connection 225 between contacts 221 and 223.

The inner coil stack 204 has at ends thereof inductive heating devices 216 and 218. The outer superconducting coil 208 has at ends thereof inductive heating devices 240 and 242. Electrical connections 254 and 256 provide power to the inductive heating devices 216 and 218 of the inner superconducting coil stack 204. Electrical connections 260 and 264 provide power to the inductive heating devices 240 and 242 of the outer superconducting coil 208. The electrical connections 254, 256, and 260, 264 are connected to a quench power supply 268. The quench power supply 268 is connected to a quench detector 284 by a connection 288. The inner superconducting coil stack 204 has quench sensor components 270 such as voltage tabs which communicate through signal line 282 to the quench detector 284. The outer superconducting coil stack 208 has quench sensor components 274 such as voltage tabs which connect through signal line 278 to the quench detector 284.

In operation, upon detection of a quench through the quench sensors 270 and 274 the quench detector 284 communicates with the quench power supply 268 by operation of a suitable processor 285 to cause the quench power supply 268 to energize the inductive heating devices 216, 218, 240 and 242 to generate an electromagnetic field to heat the inner coil stack 204 and the outer coil stack 208. The processor can control the quench power supply 268 through control line 288. The processor 285 can also send an appropriate signal through signal line 287 to the magnet power supply 230 to take appropriate action such as to shut down power to the superconducting magnet.

Figure 5:
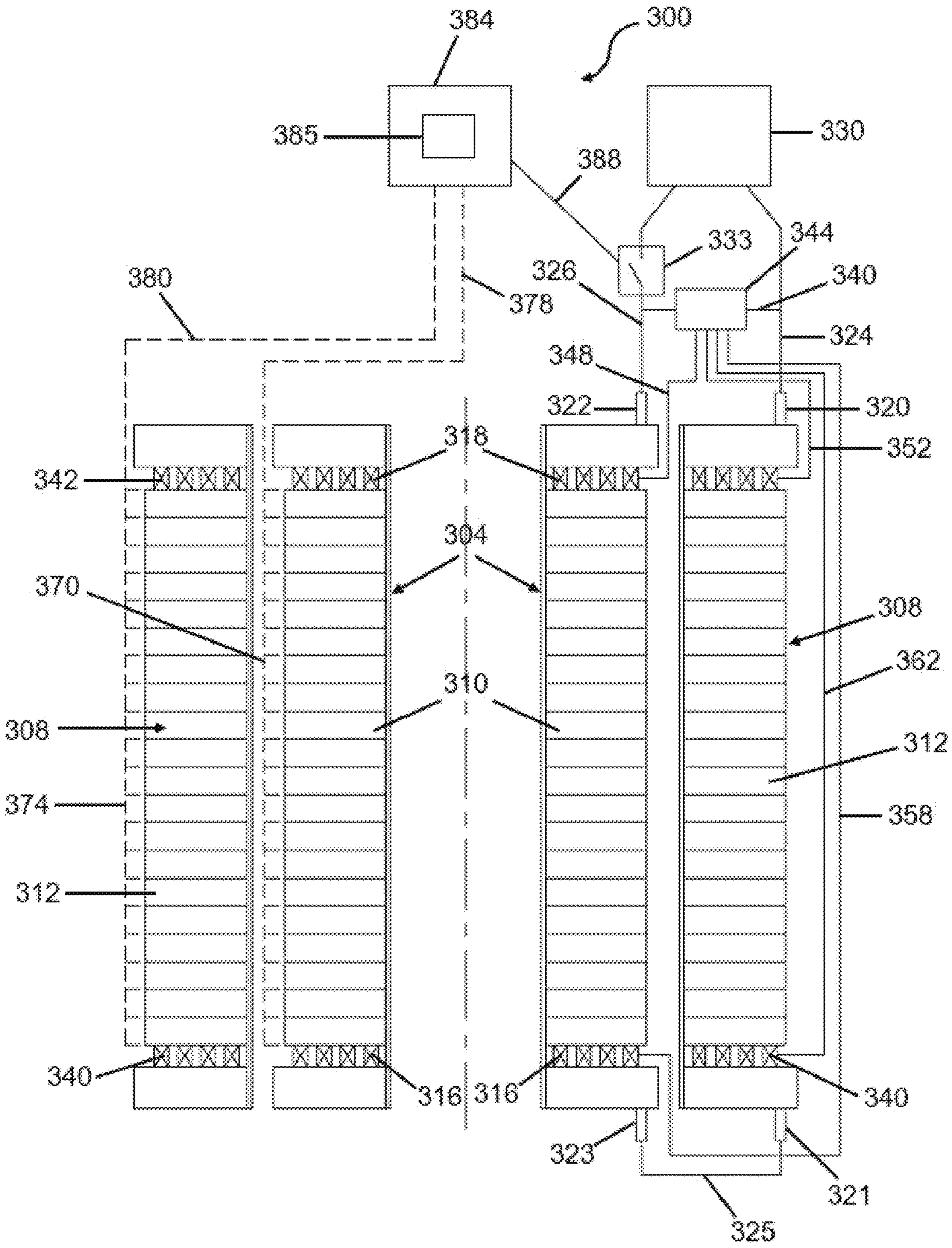
FIG. 5 is a schematic cross sectional diagram of a multiple coil pancake wound superconducting magnet with an alternative active quench protection system.

FIG. 5 is a schematic diagram of a pancake wound multiple coil superconducting magnet with an alternative active quench protection system 300. The superconducting magnet includes an inner coil stack 304 and an outer coil stack 308. The inner coil 304 is comprised of a plurality of stacked superconducting pancake coils 310. The outer pancake wound coil stack 308 is comprised of stacked superconducting pancake coils 312. A contact 320 communicates the outer coil stack 308 with magnet power source 330 by electrical connection 324. A contact 322 communicates the inner coil stack 304 with the magnet power source 330 by electrical connection 326. A power bridge can be provided by the electrical contacts 321 and 323, and the electrical connection 325.

The inner coil stack 304 has at ends thereof inductive heating devices 316 and 318. The outer superconducting coil stack 308 has at ends thereof inductive heating devices 340 and 342. Electrical connections 348 and 358 provide power to the inductive heating devices 316 and 318 of the inner coil stack 304. Electrical connections 352 and 362 provide power to the inductive heating devices 340 and 342 of the outer coil stack 308. A switch 333 is provided between the magnet power source 330 and the magnet coil stacks 304 and 308. A shunt circuit 340 includes a DC-AC converter 344. The inner superconducting coil stack 304 has quench sensor components 370 connected to sensor line 378 leading to quench detector 384. The outer superconducting coil stack 308 has quench sensor components 374 leading connected by signal line 382 to the quench detector 384. The quench detector 384 can be connected by line 388 to switch 333. A processor 385 can generate a signal through the signal line 388 upon receipt of a quench signal. This will open the switch 333 and remove the magnet coil stacks 304 and 308 from the magnet power source 330. The current in the superconducting coils consisting of the coil stacks 304 and 308 will be passed to the DC-AC converter 344 which will generate a time varying electrical impulse to the inductive heating devices 316, 318, 340 and 342. This will result in the generation of an electromagnetic field that will heat the superconducting coils 310 and 312 at various locations and will quench the coils stacks 304 and 308.

Figure 6:
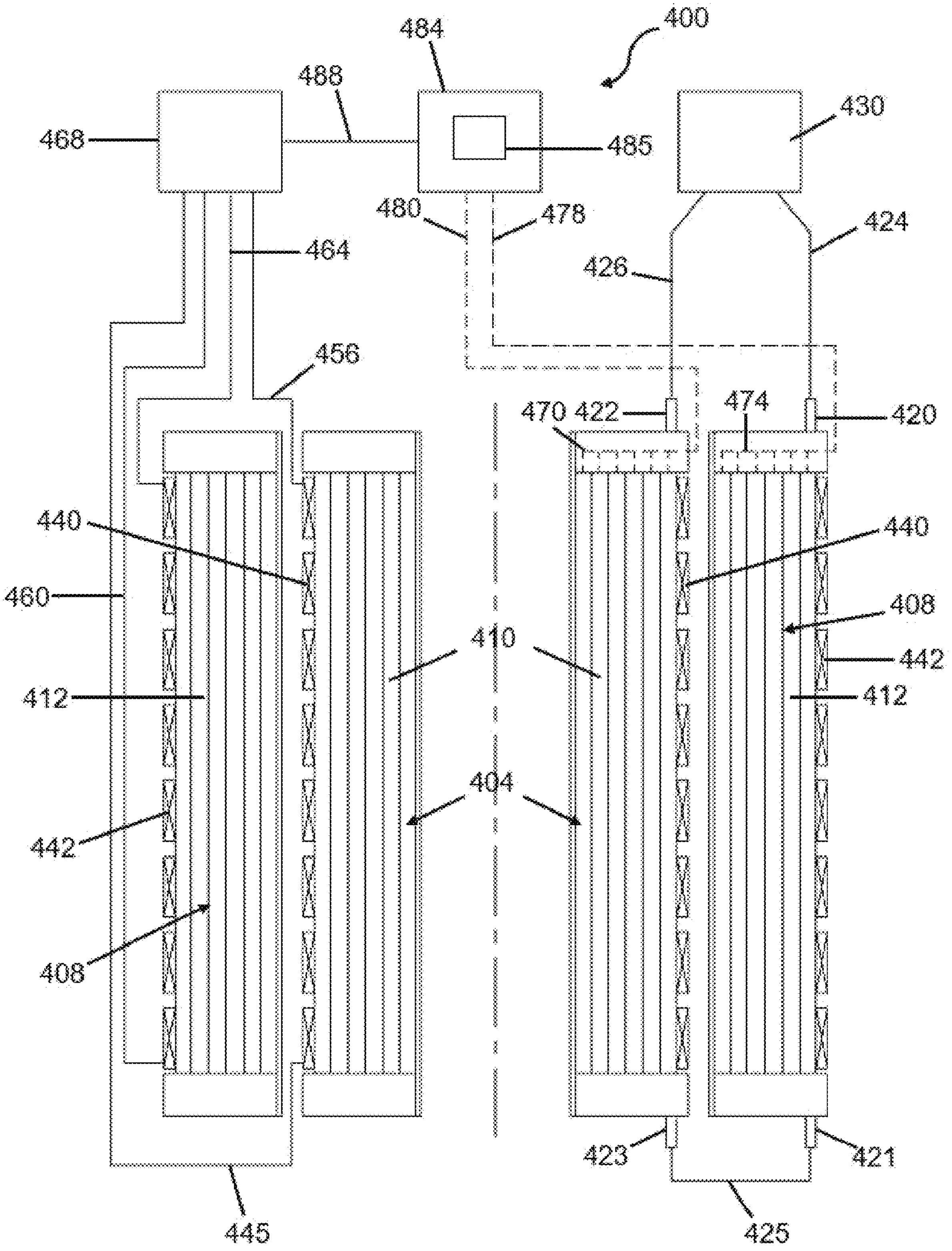
FIG. 6 is a schematic cross sectional diagram of a multiple coil layer wound superconducting magnet with an active quench protection system.

FIG. 6 is a schematic diagram of a layer wound multiple coil superconducting magnet with an active quench protection system 400. The magnet can include an inner layer wound coil 404 and an outer layer wound coil 408. The inner layer wound coil 404 includes layers 410 of superconducting coil. The outer layer wound coil 408 includes layers 412 of layer wound superconducting coil. The inner layer wound coil 404 is provided with electrical contacts 422 and 423, which are connected to the magnet power supply 430 by connection 426. An electrical connection 425 can connect the contact 421 to the contact 423. The outer layer wound coil 408 has electrical contacts 420 and 421 and is connected to the magnet power source 430 by a connection 424. Inductive heating devices 440 are provided with the inner layer wound superconducting coil 404. Inductive heating devices 442 are provided with the outer layer wound superconducting coil 408. The inductive heating devices can be spirally and axially wound coils which can be cylindrical in configuration. The conductors of the inductive heating devices for a layer wound superconducting coil can be axially oriented, running in the axial direction up and down the outside surface of the coil. The inductive heating device conductors can also be in a dipole configuration in which some turns wrap around the coil in one direction, and then reverse to wind in the other direction. The inductive heating device conductors can also be first wound as a flat coil, and then formed fitted to the outer cylindrical surface of the layer wound coil. This would form a saddle shaped inductive heating device.

The inductive heating devices 440 are connected to a quench power supply 468 by electrical connections 445 and 456. Inductive heating devices 442 are connected to the quench power supply 468 by electrical connections 460 and 464. Quench sensor components 470 are associated with the inner layer wound core 404. Quench sensor components 474 are associated with the outer layer wound superconducting coil 408. The quench sensor components 470 are connected by signal line 480 to a quench detector 484. The quench sensor components 474 are connected by a signal line 478 to the quench detector 484. A processor 485 can be associated with the quench detector 484. Upon receipt by the quench detector 484 of a quench signal from the quench sensor components 470 and/or 474, the processor 485 can act through signal line 488 to cause the quench power supply 468 to power the inductive heating devices 440 and 442 to generate an electromagnetic field and heat and quench the inner superconducting coil 404 and the outer superconducting coil 408.

Figure 7:
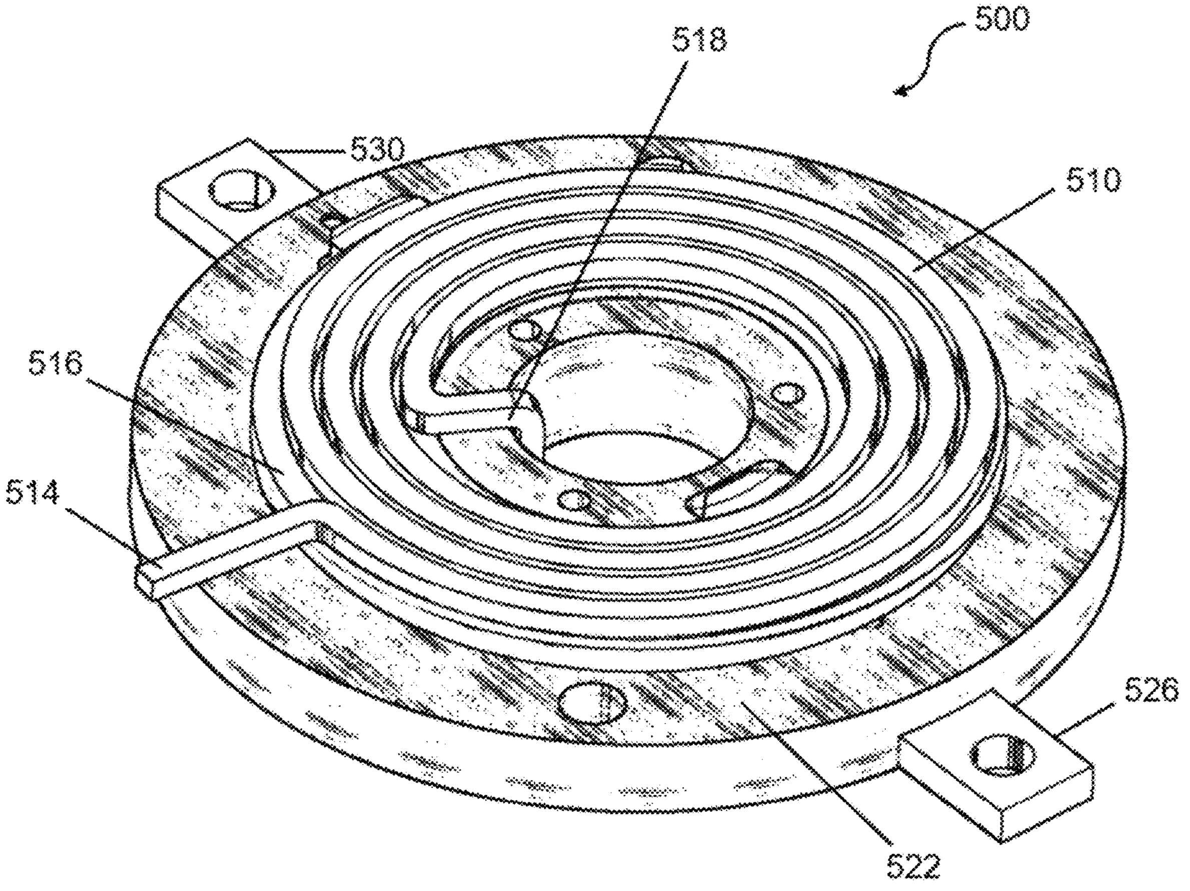
FIG. 7 is a perspective view of a coil wound inductive heating device in position on a single pancake superconducting coil.

FIG. 7 is a perspective view 500 of a circular coil inductive heating device positioned above a single pancake superconducting coil 516, both of which are held by support 522. The device includes a circular coil 510 with power leads 514 and 518 to be connected to a suitable power supply. The connecting lugs 526 and 530 extending from the support form the current leads for the superconducting coil. The assembly shown in FIG. 7 is the assembly that was tested in the fixture shown in FIG. 11.

Figure 8:
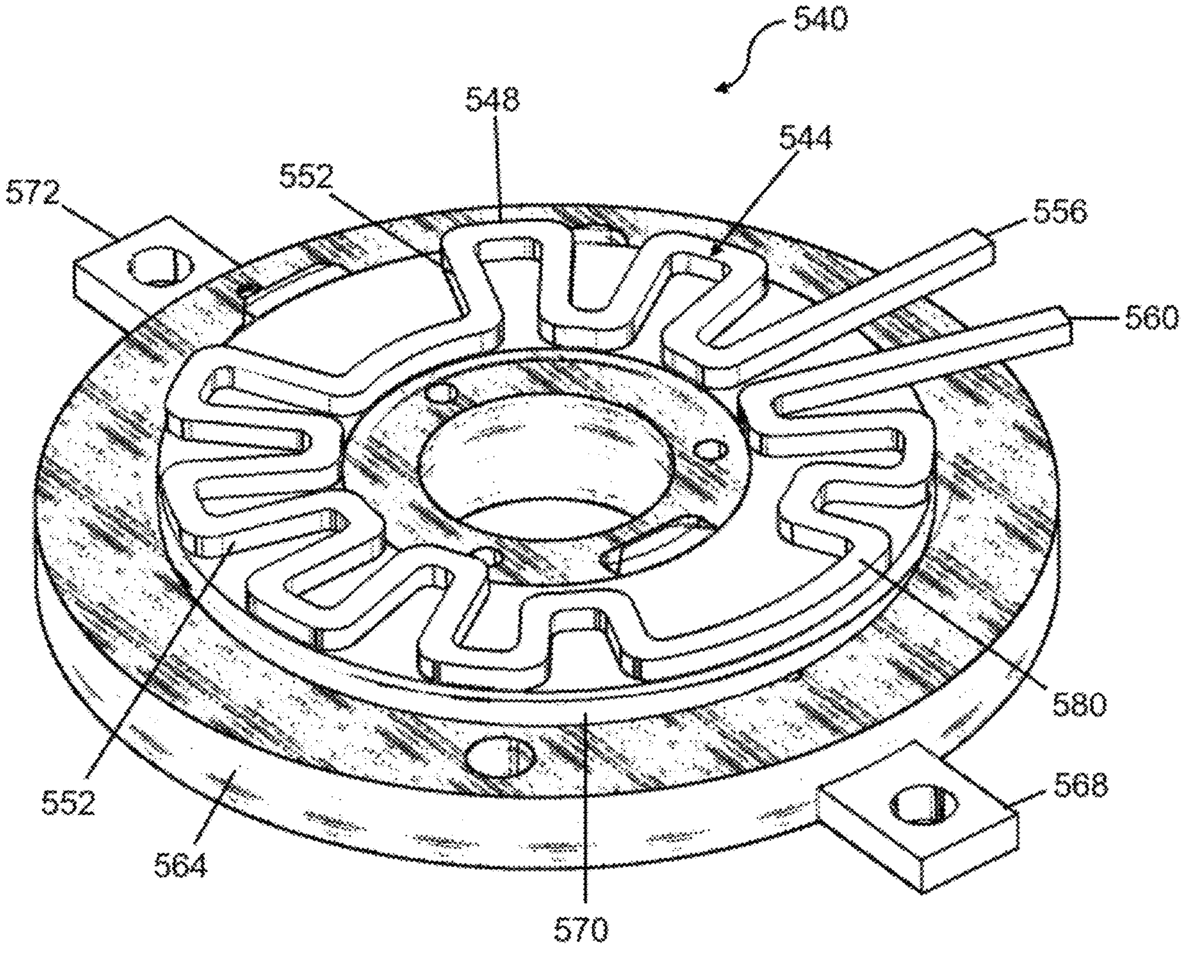
FIG. 8 is a perspective view of a radial inductive heating device in position on a single pancake superconducting coil.

FIG. 8 is a perspective view 540 of a radial inductive heating device which is positioned above a single pancake superconducting coil 570, both of which are held by support 564. The device can include an inductive heating coil 544 which includes circumferential portions 548 and radial portions 552. Electrical power connections 556 and 560 are provided. The connecting lugs 568 and 572 extending from the support form the current leads for the superconducting coil. Cut out portions 580 can be provided to mate with corresponding portions of the magnet.

Figure 9:
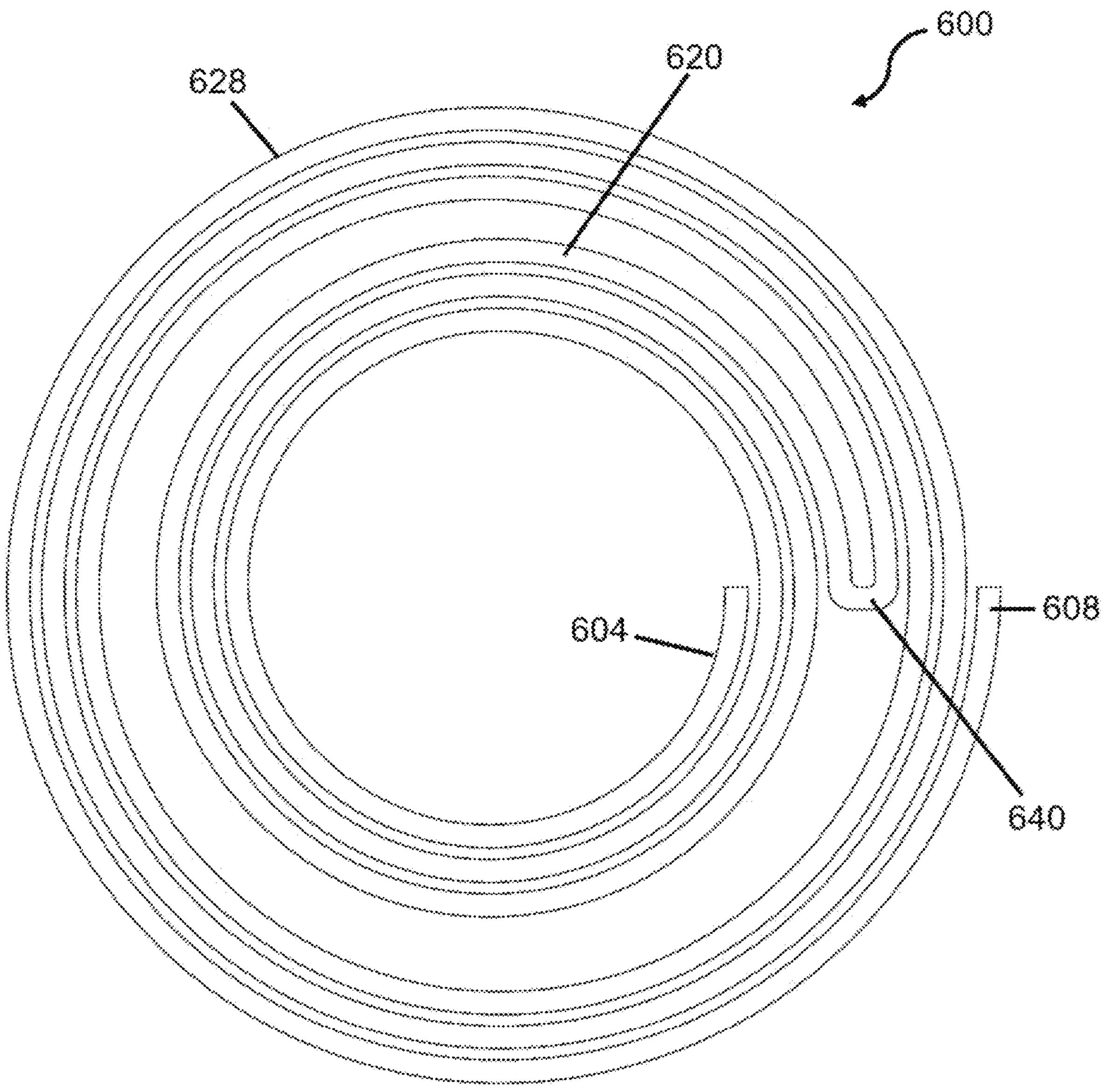
FIG. 9 is a plan view of a circular dipole inductive heating device.
Figure 10:
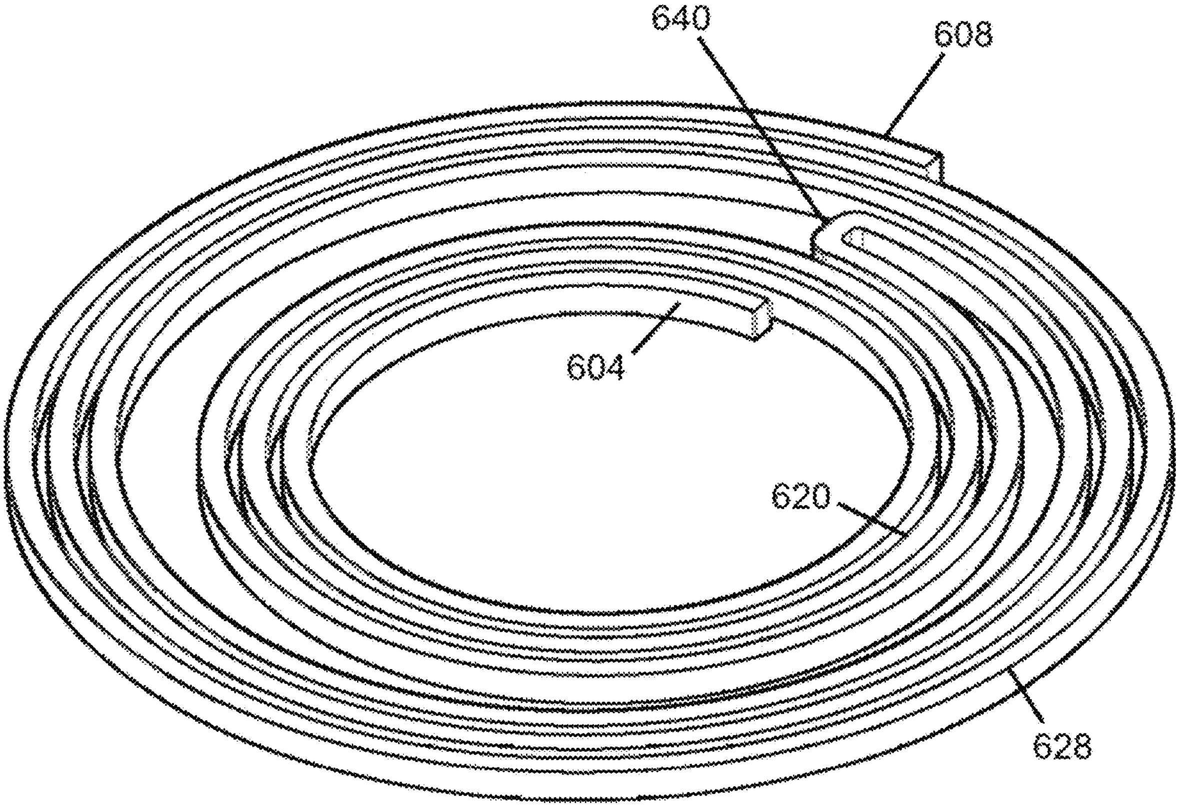
FIG. 10 is a perspective view of a circular dipole inductive heating device.

FIGS. 9-10 depict a circular dipole inductive heating device 600. The circular dipole inductive heating device 600 includes ends 604 and 608 which can be connected to a suitable power supply (not shown). The coil has an inner, counterclockwise wound coil portion 620 and an outer, clockwise wound portion 628 connected by reversing bend 640.

The inductive heating devices can be placed on the end pancake of a coil, and can be separated by a thin insulating spacer typically of G10 epoxy fiber composite. When energized with an AC or transient current, the magnetic field of the inductive heating device extends into the adjacent pancake coil. In response to the imposed transient field, currents are induced in the pancake coil. If the pancake coil is part of a no-insulation coil winding, the pancake coil has circumferential and radial conductivity. The induced currents for the radial inductive heating device are expected to be radial image currents under the spokes, and circumferential currents under the return arcs at the ends of the spokes, and thus a combination of radial and circumferential currents. The inductive coupling between the circular heating coil and the pancake coil tends to form circular induced currents. In a large insulated coil, there can be only one current, the global transport current. In that case, the action of the inductive heating devices would be primarily to create a voltage in the windings of an insulated coil with a large inductance. In an NI coil, however, the circular current is able to close back on itself by having a radial current component.

The inductive heating device is intended to quench a superconducting REBCO coil operated at 4.2 K in liquid helium and at high magnetic field. Both liquid helium operation and high fields are demanding conditions for a test facility. REBCO superconductor is in a class called High Temperature Superconductor due to the fact that its critical temperature is much higher than the conventional Low Temperature Superconductor. The critical temperature of REBCO is around 90 K. This allows operation of a REBCO coil at liquid nitrogen temperature of 77 K to be fully superconducting, which is a critical condition for the tests, and avoids the need for testing at liquid helium temperature. While REBCO conductor is fully superconducting at liquid nitrogen temperature, the temperature increment between the superconducting and normal states is naturally reduced in comparison to operation at liquid helium temperature, so that operation at high field is not required to create this condition. In this way, operating a test coil at liquid nitrogen temperature in relatively low field (self-field) provides a test environment that has the conditions of the intended environment for heater operation. For the present test, the condition of a high field coil operating at 4 K is well simulated by a REBCO coil operating in low field at 77 K. The end pancake of a high field coil in actual application is replaced by a single pancake operated with a current such that it is fully superconducting in the resulting self-field.

Figure 11:
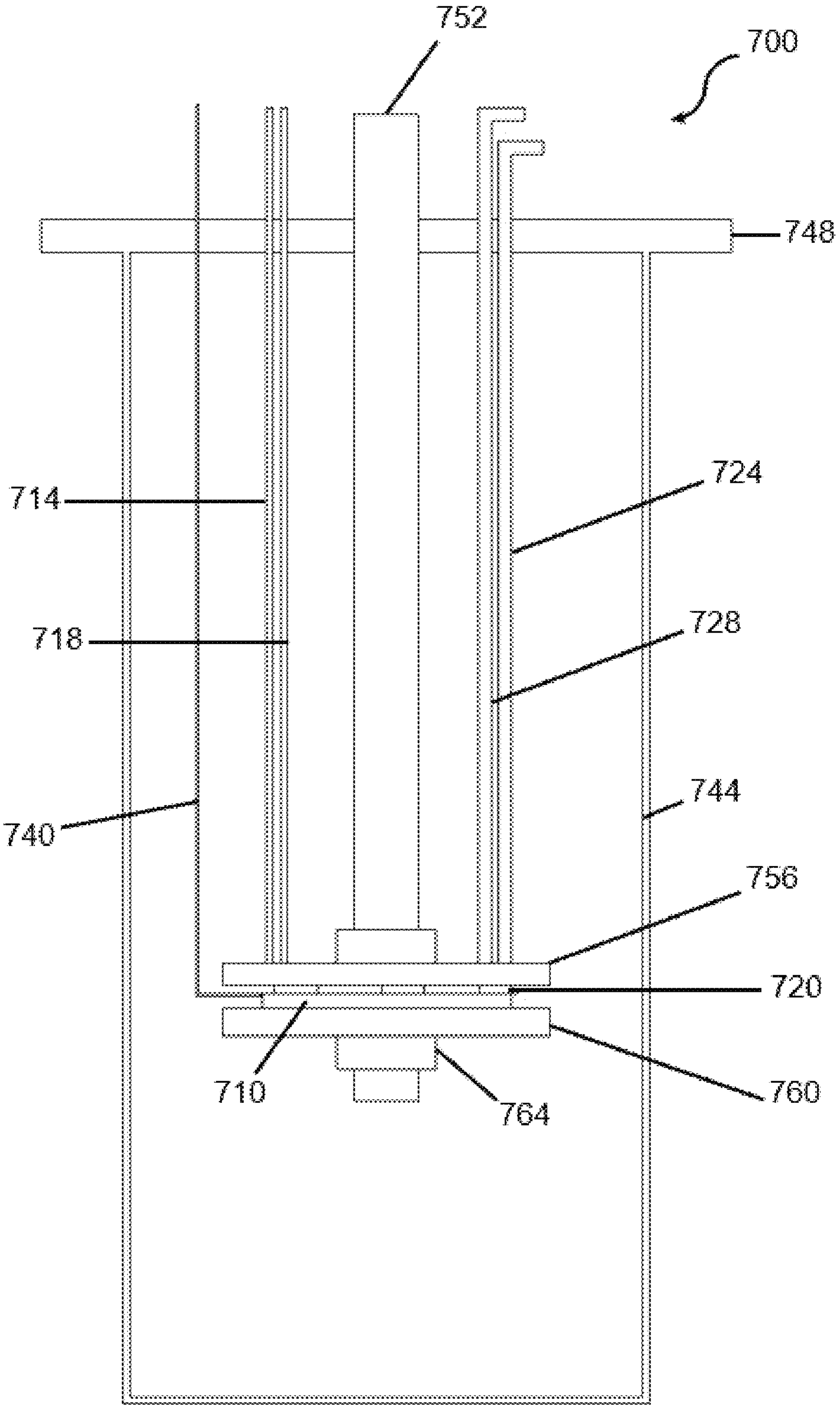
FIG. 11 is a cross sectional diagram of a testing assembly for an active quench protection system including a single pancake coil and inductive heating device.

The invention utilizes the inductive heating device to quench a superconducting coil, and especially a NI superconducting coil. Because of the fast natural quench propagation within an NI coil, using the inductive heating device to quench an end pancake of a long coil is adequate to quench the entire coil. A cryogenic test facility was prepared and used for quench testing of a single pancake REBCO coil with radial and circular inductive heaters. The cryogenic test facility includes the coil test assembly and is contained in a liquid nitrogen cryostat. The coil test assembly is shown in FIG. 11. The coil test assembly includes the REBCO coil 710, heater 720 and G10 flanges 756 and 760 mounted to support rods 752 and secured by threaded nut 764. The superconducting coil 710 is powered by power connections 714 and 718. The heater device 720 is powered by connections 724 and 728. Quench detector signal line 740 was connected to a suitable quench detector. The apparatus was contained within a housing 744 with a closure 748. There are a set of power leads for energizing the coil, and another set of high current leads for activation of the heater. Instrumentation was assembled for data acquisition to determine the operating conditions of the coil and to monitor the response to firing of the inductive heating device. The instrumentation included temperature sensors, magnetic field sensors, and voltage taps. The liquid nitrogen fill tube provided cooling of the coil. External to the cryostat, there was a power supply for the coil current, power supplies for operation of the inductive heater, and the data acquisition system. The power supplies for the inductive heater included an AC power source for pulsed action, and a capacitor bank for a discharge source. The data acquisition system used LabVIEW.

For the purpose of the test, a single NI pancake coil was wound of REBCO superconducting tape, as shown in FIG. 11, to simulate the end pancake of a long coil. The measured dimensions of the conductor were 4.05 mm wide by 0.094 mm thick. Stainless steel tape measuring 4.12 mm wide by 0.025 mm thick was co-wound with the REBCO conductor. The coil had an inside diameter of 40 mm, outside diameter of 76 mm, and had 151 turns. The coil was mounted to a G10 flange with copper lug connections at the inner and outer diameter for current leads. An insulating spacer made of thin G10 separated the coil from the inductive device (0.125 mm total thickness). The coil and inductive heating device assembly was held together mechanically with a top G10 flange that also provides thermal isolation of the coil and heater from the surroundings.

The test was arranged in such a way as to allow the coil to be cooled down to near 77K without the coil being submerged in liquid nitrogen. It was thought that the cooling effect of the liquid nitrogen might allow the coil to stabilize too quickly after being quenched, thereby minimizing the observed effect of the induction heater. Keeping the coil cold but in gaseous nitrogen was intended to simulate conditions to better demonstrate quench behavior. A silicone tube was connected to the nitrogen fill line and used to spray liquid nitrogen directly on the top face of the G-10 flange. This allowed the coil to be cooled through conduction to the flange and also by the cold gaseous nitrogen in the cryostat around the coil.

The coil, once cooled to 77K, was energized and then subjected to heater pulses at different current values and for various lengths of time to obtain a range of data. For much of the testing, the coil was ramped to 50 A, approximately 5 A from where it began to transition to the resistive state. When ramping stopped the coil stabilized and then heater pulses were conducted. The current input and duration for the inductive device is determined by user inputs on the induction power supply and activated by a manual switch. The frequency of the heater pulse was not user adjustable and was at or near 136 kHz for nearly the entire range of pulses. To evaluate the performance of the system, several pulses were conducted at moderate to high energy levels (high current, long duration) to see the maximum effect on the coil. Then a series of pulses were conducted at low energy levels (low current and/or short duration) in order to investigate the lower limits of the effectiveness of the quench heater.

A voltage tap was placed across the two coil terminals to measure coil voltage during the test. The thermocouple was mounted in a hole in the top G-10 flange at a distance of 1-2 mm from the face of the pancake. The Hall sensor was placed on the side of the bore, level with the top of the pancake, and oriented to measure axial field.

Quench propagation in NI coils, once established, proceeds rapidly. The onset of quench, however, can be quite different. The reason for slow quench onset is the large critical current and large critical temperature of HTS superconductors. For example, a local fault condition may lead to initial heating to the point that the critical current begins to be exceeded. Because of low turn-to-turn contact resistance in an NI coil, a portion of the operating current, or circumferential current, then becomes radial and decreases the current through the normal zone, thereby decreasing the rate of heating. The rate of heating is decreased at the same time that a large temperature increase is required to approach the critical temperature and have the conductor become fully normal. This tends to slow the initial development of quench in NI coils.

Figure 12:
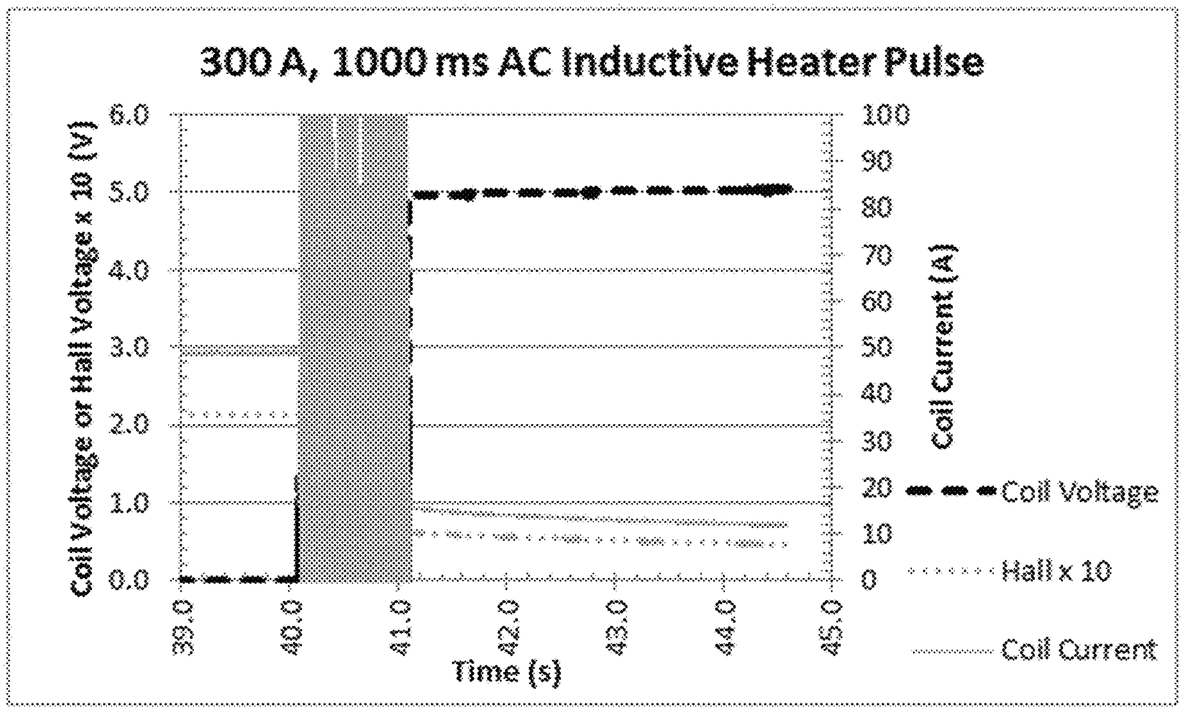
FIG. 12 is a plot of coil voltage and Hall voltage×10 (V) vs. Time (s) for a 300 A, 1000 ms AC inductive heater pulse.
Figure 13:
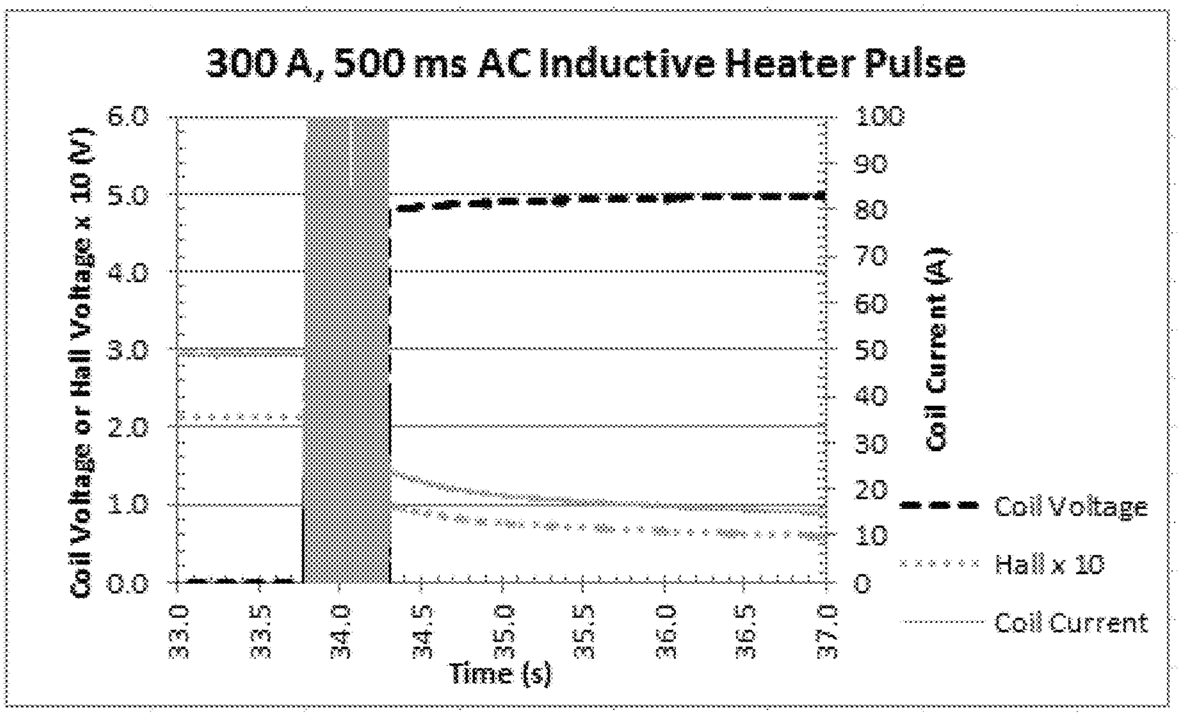
FIG. 13 is a plot of coil voltage and Hall voltage×10 (V) vs. Time (s) for a 300 A, 500 ms AC inductive heater pulse.
Figure 14:
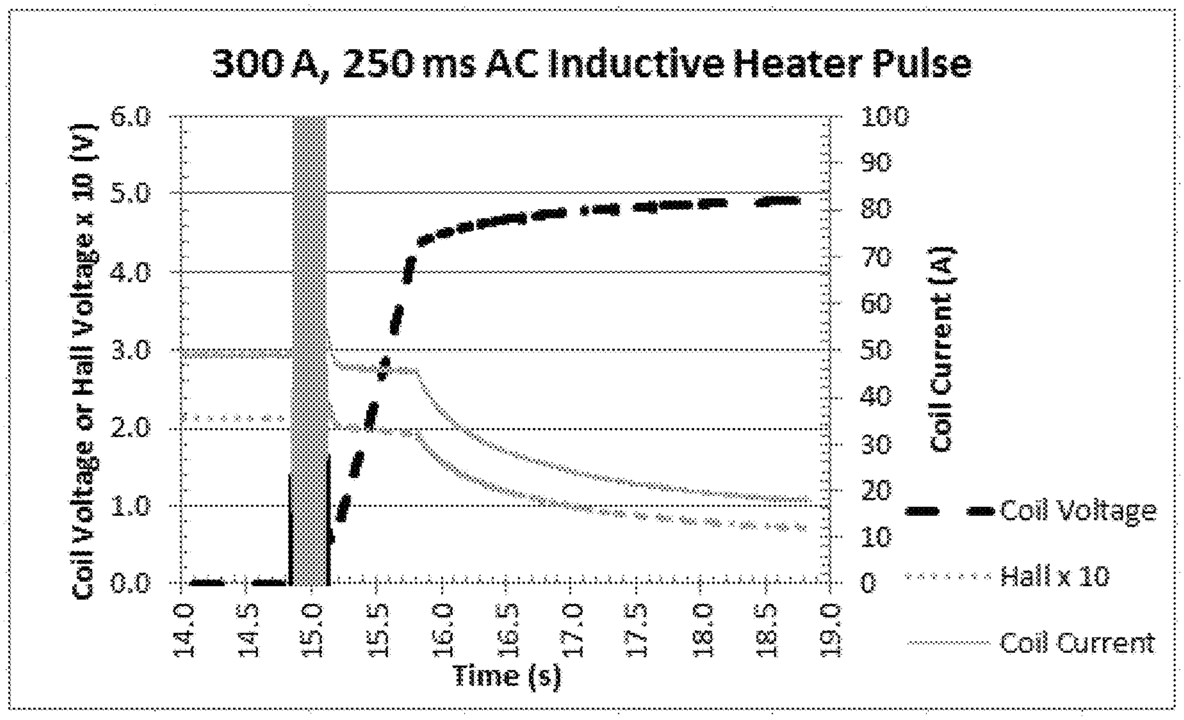
FIG. 14 is a plot of coil voltage and Hall voltage×10 (V) vs. Time (s) for a 300 A, 250 ms AC inductive heater pulse.

The traces obtained by data acquisition for tests with the circular inductive heating device are given in FIGS. 12, 13, and 14 for successively shorter activation times of the AC supply. The traces show the measured coil voltage and Hall probe voltage, and also the coil current as a function of time from before, during, and after the excitation of the inductive heater by the AC power supply. In each case, the initial coil current is 50 A, providing the condition of a fully superconducting coil in self-field at nitrogen temperature. In each case, the measured initial coil voltage was recorded as zero, as expected. The Hall voltage corresponds to a field at the Hall probe from the coil, and provided a relative indication of the field produced by the coil.

The results of the first test are given in FIG. 12, where the initial values of the current and voltage traces are seen. The AC supply was activated for 1000 millisec starting at roughly 40 sec on the graph. During the supply activation time, the electrical pickup noise obscured the current and voltage traces. At the end of the heater activation time, the current and voltage traces were again seen. The coil current and the Hall voltage, which are a measure of the field in the coil, are significantly reduced. The coil voltage, on the other hand, had increased from zero to a high plateau value. The interpretation of the trace is that during the time of activation of the AC supply, the coil has quenched and reached a state of residual slow current decay. The remaining current in the coil is seen to be further decreasing. Although the coil has presumably quenched and is resistive, the power supply is still operating at a maximum voltage set point of approximately 5 volts. After the first test run, the coil was cooled again to 77 K and ramped to the initial condition of 50 A.

The results of a second test, shown in FIG. 13, were obtained for a power supply activation time of 500 millisec. The traces are similar to the first test cycle, with again the starting values of current and voltage in the traces, the noise at the AC activation time interval, and the resulting behavior of the current and voltage. The traces again show a full quench of the coil, with a slight difference that the current in the coil is seen earlier in the current decay process. The same reduction in coil current is observed, and the coil voltage is again seen to rise to the power supply limit.

The results of the third test shown in FIG. 14 are for a shorter activation time yet of the inductive heater to 250 millisec. The characteristic gradual onset of quench in an NI coil is seen. At the end of the heater activation time, the coil has clearly quenched, showing increased voltage. The continued increase in the coil voltage is interpreted as possibly due to the spread of quench within the coil, but also due to the increase of the coil temperature to approach the zero current critical temperature. In the early stage of quench, the power supply reacts to maintain the coil current until the power supply maximum voltage set point is reached, to be followed by the current and field decay that is seen in the traces. The gradual nature of the quench in the test is accentuated by the fact that the test is performed at 77 K instead of 4.2 K. At the higher temperature, the specific heat of the conductor is much greater and the rate of heating is correspondingly slowed in comparison with quench at 4.2 K. The results of the tests shown in FIGS. 12-14, and especially the observed quench at 250 millisec, give a firm indication of the performance of the inductive heater and the ability to quench a REBCO superconducting coil in a relatively short time.

The invention as shown in the drawings and described in detail herein disclose arrangements of elements of particular construction and configuration for illustrating preferred embodiments of structure and method of operation of the present invention. It is to be understood however, that elements of different construction and configuration and other arrangements thereof, other than those illustrated and described may be employed in accordance with the spirit of the invention, and such changes, alternations and modifications as would occur to those skilled in the art are considered to be within the scope of this invention as broadly defined in the appended claims. In addition, it is to be understood that the phraseology and terminology employed herein are for the purpose of description and should not be regarded as limiting.

We claim:

1. An active quench protection system for a superconducting coil in a magnet, comprising:

a quench detector;

an inductive heating device configured to generate an electromagnetic field to inductively heat a portion of the superconducting coil;

a processor for generating a quench signal responsive to the detection of a quench by the quench detector to cause the inductive heating device to generate the electromagnetic field to inductively heat a portion of the superconducting coil; and, a quench power source for supplying a time varying current to the inductive heating device to generate the electromagnetic field responsive to a quench signal from the processor.

2. The quench protection system of claim 1, wherein the inductive heating device comprises circular coiled conductor portions.

3. The quench protection system of claim 1, wherein the inductive heating device comprises radial conductor portions.

4. The quench protection system of claim 1, wherein the inductive heating device comprises circular dipole conductor portions.

5. The quench protection system of claim 1, wherein the inductive heating device comprises a planar conductor portion.

6. The quench protection system of claim 1, wherein the inductive heating device generates an oscillating electromagnetic field having a frequency of 50 Hz to 100 kHz.

7. The quench protection system of claim 1, wherein the inductive heating device has a current of from 300 A to 3000 A.

8. The quench protection system of claim 1, wherein the quench detector comprises at least one selected from the group consisting of a voltage sensors, optical sensors, and electromagnetic field sensors.

9. The quench protection system of claim 1, wherein quench detector comprises voltage taps for detecting the voltage drop between at least two positions of the superconducting coil.

10. The quench protection system of claim 1, wherein the quench power source comprises an AC power source.

11. The quench protection system of claim 1, wherein the quench power source comprises a capacitor and a switch, wherein upon the detection of a quench by the quench detector the processor generates a quench signal to close the switch, wherein the capacitor discharges to the inductive heating device, causing the generation of the electromagnetic field by the inductive heating device.

12. The quench protection system of claim 1, wherein the quench power source comprises a shunt circuit from the superconducting coil to an dc-ac converter, the dc-ac converter being electrically connected to the inductive heating device, and further comprising a quench switch between the superconducting coil and a superconducting coil power source, wherein upon the detection of a quench by the quench detector, the processor generates a quench signal to open the quench switch to shut off supply current to the superconducting coil, and a residual dc current from the superconducting coil is directed through the shunt circuit to the dc-ac converter, the converter changing direct current from the superconducting coil to alternating current, the alternating current generating the electromagnetic field in the inductive heating device.

13. The quench protection system of claim 1, wherein the superconducting coil is pancake wound.

14. The quench protection system of claim 1, wherein the superconducting coil is layer wound.

15. The quench protection system of claim 14, wherein the inductive heating device comprises at least one selected from the group consisting of axially directed portions, spiral portions, cylindrical portions and saddle-shaped portion.

16. The quench protection system of claim 1, wherein the superconducting coil is a no insulation coil.

17. The quench protection system of claim 1, wherein the superconducting coil comprises rare earth barium copper oxide (ReBCO).

18. The quench protection system of claim 1, wherein the superconducting coil is an insulated rare earth barium copper oxide (ReBCO).

19. The quench protection system of claim 1, wherein a portion of the inductive heating device conforms to at least one selected from the group consisting of the dimensions and the shape of the superconducting coil.

20. The quench protection system of claim 1, wherein an inductive heating device is provided at both ends of the superconducting coil or superconducting coil stack.

21. A magnet, comprising:

a superconducting coil;

a quench detector for detecting a quench in the superconducting coil; and, an inductive heating device configured to generate an electromagnetic field to inductively heat a portion of the superconducting coil;

further comprising a processor for generating a quench signal responsive to the detection of a quench by the quench detector to cause the inductive heating device to generate the electromagnetic field to inductively heat a portion of the superconducting coil, and a quench power source for supplying a time varying current to the inductive heating device to generate the electromagnetic field responsive to a quench signal received from the processor.

22. The magnet of claim 21, wherein the quench power source comprises a capacitor and a switch, wherein upon the detection of a quench by the quench detector the processor generates a quench signal to close the switch, wherein the capacitor discharges to the inductive heating device, causing the generation of the electromagnetic field by the inductive heating device.

23. The magnet of claim 21, wherein the quench power source comprises a shunt circuit from the superconducting coil to an dc-ac converter, the dc-ac converter being electrically connected to the inductive heating device, and further comprising a quench switch between the superconducting coil and a superconducting coil power source, wherein upon the detection of a quench by the quench detector, the processor generates a quench signal to open the quench switch to shut off supply current to the superconducting coil, and a residual dc current from the superconducting coil is directed through the shunt circuit to the dc-ac converter, the converter changing direct current from the superconducting coil to alternating current, the alternating current generating the electromagnetic field in the inductive heating device.

24. A magnet, comprising:
a superconducting coil;
a quench detector for detecting a quench in the superconducting coil; and,
an inductive heating device configured to generate an electromagnetic field to inductively heat a portion of the superconducting coil, wherein the inductive heating device comprises circular conductor portions.

25. A magnet, comprising:
a superconducting coil;
a quench detector for detecting a quench in the superconducting coil; and,
an inductive heating device configured to generate an electromagnetic field to inductively heat a portion of the superconducting coil, wherein the inductive heating device comprises radial conductor portions.

26. A magnet, comprising:
a superconducting coil;
a quench detector for detecting a quench in the superconducting coil; and,
an inductive heating device configured to generate an electromagnetic field to inductively heat a portion of the superconducting coil, wherein the inductive heating device comprises circular dipole conductor portions.

27. A magnet, comprising:
a superconducting coil;
a quench detector for detecting a quench in the superconducting coil; and,
an inductive heating device configured to generate an electromagnetic field to inductively heat a portion of the superconducting coil, wherein the inductive heating device is planar.

28. A magnet, comprising:
a superconducting coil;
a quench detector for detecting a quench in the superconducting coil; and,
an inductive heating device configured to generate an electromagnetic field to inductively heat a portion of the superconducting coil, wherein the inductive heating device generates an oscillating electromagnetic field having a frequency of 50 Hz to 100 kHz.

29. A magnet, comprising:
a superconducting coil;
a quench detector for detecting a quench in the superconducting coil; and,
an inductive heating device configured to generate an electromagnetic field to inductively heat a portion of the superconducting coil, wherein the inductive heating device has a current of from 300 A to 3000 A.

30. A magnet, comprising:
a superconducting coil;
a quench detector for detecting a quench in the superconducting coil, wherein the quench detector comprises at least one selected from the group consisting of voltage sensors, optical sensors, and electromagnetic field sensors; and
an inductive heating device configured to generate an electromagnetic field to inductively heat a portion of the superconducting coil.

31. A magnet, comprising:
a superconducting coil;
a quench detector for detecting a quench in the superconducting coil; and,
an inductive heating device configured to generate an electromagnetic field to inductively heat a portion of the superconducting coil, wherein a portion of the inductive heating device conforms to at least one selected from the group consisting of the dimensions and the shape of the superconducting coil.

32. A magnet, comprising:
a superconducting coil;
a quench detector for detecting a quench in the superconducting coil, wherein the quench detector comprises voltage taps for detecting the voltage drop between at least two positions of the superconducting coil; and
an inductive heating device configured to generate an electromagnetic field to inductively heat a portion of the superconducting coil.

33. A magnet, comprising:
a superconducting coil comprising a plurality of superconducting coils;
a quench detector for detecting a quench in the superconducting coil; and,
an inductive heating device adjacent each coil configured to generate an electromagnetic field to inductively heat a portion of the superconducting coil.

34. The magnet of claim 33, wherein the superconducting coils are stacked, and inductive heating devices are interposed between superconducting coils in the stack.

35. A magnet, comprising:
a superconducting coil, wherein the superconducting coil is pancake wound;
a quench detector for detecting a quench in the superconducting coil; and
an inductive heating device configured to generate an electromagnetic field to inductively heat a portion of the superconducting coil.

36. A magnet, comprising:
a superconducting coil, wherein the superconducting coil is layer wound;
a quench detector for detecting a quench in the superconducting coil; and,
an inductive heating device configured to generate an electromagnetic field to inductively heat a portion of the superconducting coil.

37. A magnet, comprising:
a superconducting coil, wherein the superconducting coil comprises rare earth barium copper oxide (ReBCO);
a quench detector for detecting a quench in the superconducting coil; and, an inductive heating device configured to generate an electromagnetic field to inductively heat a portion of the superconducting coil.

38. A magnet, comprising:

a superconducting coil, wherein the superconducting coil is a no insulation coil;

a quench detector for detecting a quench in the superconducting coil; and, an inductive heating device configured to generate an electromagnetic field to inductively heat a portion of the superconducting coil.

39. A magnet, comprising:

a superconducting coil, wherein the superconducting coil is an insulated rare earth barium copper oxide (ReBCO);

a quench detector for detecting a quench in the superconducting coil; and, an inductive heating device configured to generate an electromagnetic field to inductively heat a portion of the superconducting coil.

40. A method for the active quench protection of a superconducting coil in a magnet, comprising the steps of:

providing a quench detector, an inductive heating device for generating an electromagnetic field to inductively heat a portion of the superconducting coil, a quench power supply, and a processor for generating a quench signal responsive to the detection of a quench by the quench detector to cause the inductive heating device to inductively heat a portion of the superconducting coil;

detecting a quench with the quench detector; and, generating a quench signal from the processor responsive to the detection of the quench by the quench detector and causing the quench power supply to power the inductive heating device to inductively heat a portion of the superconducting coil.

41. The quench protection system of claim 1, wherein the superconducting coil is an insulated superconducting coil.

42. Magnet, comprising:

a superconducting coil, wherein the superconducting coil is an insulated superconducting coil;

a quench detector for detecting a quench in the superconducting coil; and, an inductive heating device configured to generate an electromagnetic field to inductively heat a portion of the superconducting coil.

* * * * *